United States Patent [19]
Nelson

[11] Patent Number: 5,969,588
[45] Date of Patent: Oct. 19, 1999

[54] RATCHET AND BALL MAGNETIC INDEX DEVICE

[76] Inventor: Victor H Nelson, 8 Midvale Ct., East Northport, N.Y. 11731

[21] Appl. No.: 09/153,195

[22] Filed: Sep. 15, 1998

[51] Int. Cl.$^6$ ....................................................... H01F 7/00
[52] U.S. Cl. ........................... 335/229; 310/23; 310/156; 74/575
[58] Field of Search .................... 335/229, 231, 335/232, 233, 234; 74/86, 88, 89.12, 112, 575, 577 M; 310/23, 22, 152, 153, 156, 187

[56] References Cited

U.S. PATENT DOCUMENTS

| | | |
|---|---|---|
| 3,761,851 | 9/1973 | Nelson . |
| 3,827,308 | 8/1974 | Brown .......................................... 74/88 |
| 3,970,980 | 7/1976 | Nelson . |
| 4,617,538 | 10/1986 | Nelson . |
| 5,293,144 | 3/1994 | Krimmer ................................. 335/272 |
| 5,642,086 | 6/1997 | Nelson . |

OTHER PUBLICATIONS

Ingenious Mechanisms for Designers & Inventors vol. I, Industrial Press ©1930 NYC pp. 28–51 (no month).

*Primary Examiner*—Lincoln Donovan
*Attorney, Agent, or Firm*—Collard & Roe, P.C.

[57] ABSTRACT

A ratchet and ball magnetic index device having a drive motor plate with a top surface and a bottom surface. The drive motor plate contains at least one ball receiving recess on the periphery of the bottom surface of the drive motor plate. A permanent magnet armature is secured to the top surface of the drive motor plate and rotates freely around a rotor shaft. A sector motor rotates the armature and drive plate when turned on. A ratchet plate, attached to the rotor shaft, has a bottom surface and a top surface with a plurality of contours displaced in a circular direction around the circumference of the ratchet plate. Each of the contours has a flat plane connected to an incline plane which is connected to a vertical plane. At least one magnetically attractable drive ball is positioned between the top surface of the ratchet plate and the bottom surface of the drive motor plate, wherein the drive ball moves freely within the ball receiving recess. A plurality of permanent magnets are positioned between the top surface and the bottom surface of the ratchet plate and located beneath each of the flat planes. When the drive motor plate rotates, the drive ball grips the ratchet plate and rotates it in the same direction. As the ratchet plate is secured to the rotor shaft, anything connected to the rotor shaft is similarly rotated. The presence of the magnets allows reliable operation in a variety of environments, including space.

25 Claims, 5 Drawing Sheets

RATCHET AND BALL MAGNETIC INDEX DEVICE

BACKGROUND OF THE INVENTION

1. Field of the Invention

The invention relates generally to ratchet devices and, more particularly, to an improved ratchet and ball magnetic index device for use with remote-controlled switches.

2. The Prior Art

The prior art related to remote-controlled switches has employed various mechanical and electro-mechanical devices to simplify the operations of remote-controlled switches. Remote switches require precise movement when stepping a switch through each one of the set switch positions. It is known in the art to use indexing mechanisms to rotate an object in an intermittent motion. One of the simplest and most common methods of obtaining intermittent motion is the use of ratchet devices. Many methods have been used to rotate ratchets including a pawl and lever arm, and metallic balls disposed between a driven and driver member. A major drawback of these devices is the reliance on gravity to position the balls in the correct position. These devices are also subject to numerous other deficiencies including: poor reliability, slow response time, reliance on springs, and relatively large size.

Despite the advances in the state-of-the-art, there still remains a need for a device which will enable the remote-controlled switch to function according to a set pattern of switching options and in a wide variety of conditions, including weightlessness.

SUMMARY OF THE INVENTION

It is therefore an object of the present invention to provide a magnetic indexing device which will enable a remote controlled switch to operate according to a determined pattern of positions upon receipt of an electrical command pulse.

Another object of the present invention is to provide an indexing device for use with a multitude of remote switches including, but not limited to, coax and microwave waveguides.

It is an additional object of the invention to provide an indexing device that will function over a broad range of temperatures and pressures, and in a weightless environment.

It is another object of the invention to provide a device which is simple in design, economical to manufacture, and extremely reliable.

To achieve these objects, the invention provides a new and improved ratchet and ball magnetic index device which uses a drive motor plate and a ratchet plate in combination with permanent magnets, ratchet teeth, and steel drive balls located between the two plates. The drive motor plate contains a permanent magnet armature which is fixed to the top surface of the drive motor plate and is part of an electrical motor actuator. When the motor receives an electrical command pulse, the armature rotates and turns the attached drive motor plate. Beneath the drive motor plate, there is positioned the steel drive balls and the ratchet plate. The ratchet plate contains a plurality of ratchet teeth disposed in a circular pattern along the periphery of the ratchet plate. When the drive motor plate rotates, it engages the steel drive balls via a ball receiving recess. The steel drive balls travel in a vertical motion perpendicular to the plane of the ratchet plate and engage the ratchet plate via the ratchet teeth, causing the ratchet plate to turn in the same direction as the electric motor. A drive stop support is incorporated into the drive motor plate and is used, in combination with a drive stop pin, to limit the rotation of the motor to a set number of degrees. The ratchet plate is secured to a rotor shaft having a top and bottom end. The bottom end of the rotor shaft is then secured to a remote switch such as a microwave waveguide or coaxial switch. In this preferred embodiment, the ratchet and ball magnetic index device provides reliability to the field of remote-controlled switches which rotate a set number of degrees with each activation.

In an additional embodiment of the invention, the steel drive balls may be made to move parallel to the ratchet plate and still provide the same function.

BRIEF DESCRIPTION OF THE DRAWINGS

Other objects and features of the present invention become apparent from the following detailed description considered in connection with the accompanying drawings which disclose the embodiments of the present invention. It should be understood, however, that the drawings are designed for the purpose of illustration only not as a definition of the limits of the invention.

In the drawings, wherein similar reference characters denote similar elements throughout the several views.

DETAILED DESCRIPTION OF PREFERRED EMBODIMENT

Figure 1:
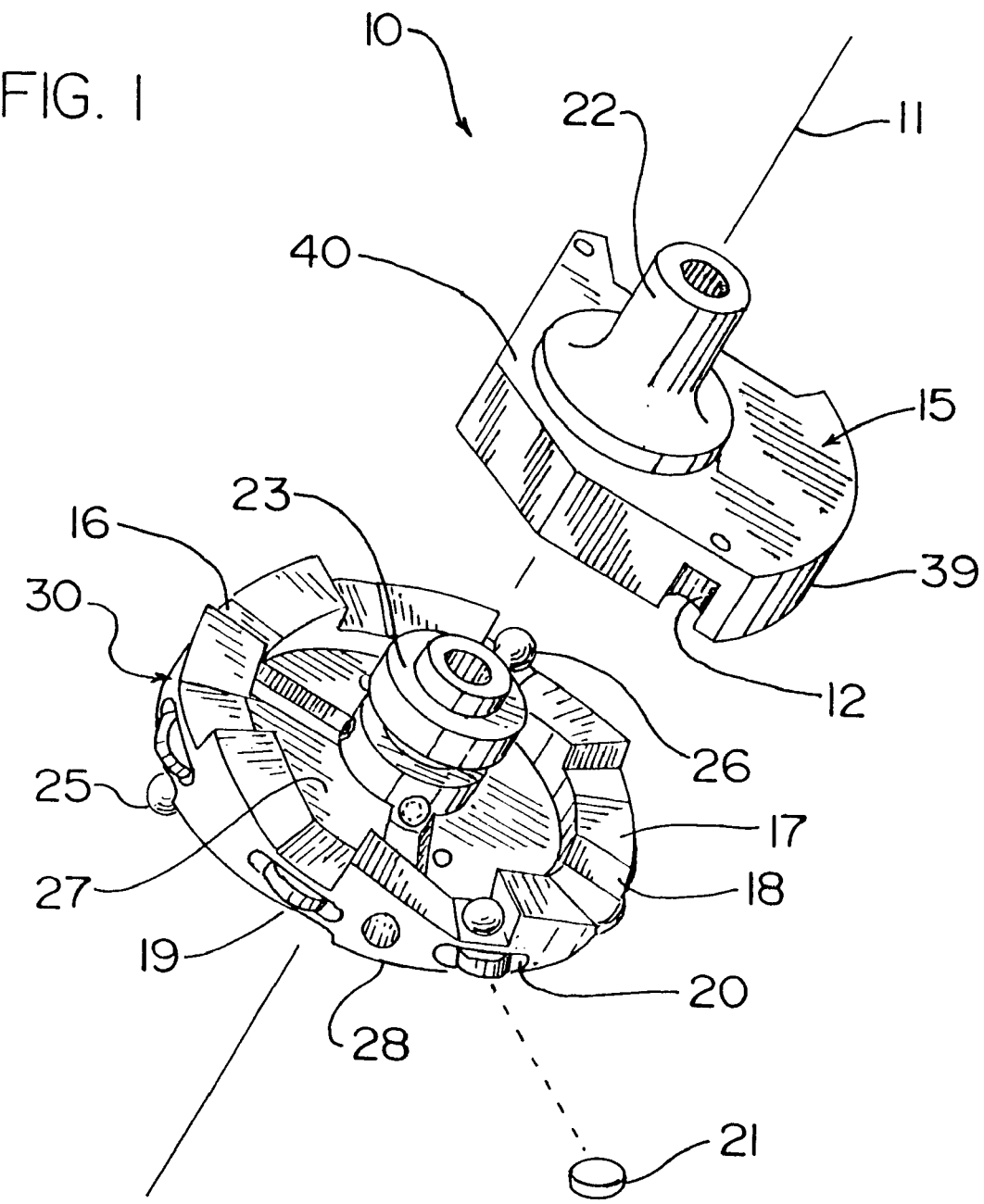
FIG. 1 is a perspective view of the preferred embodiment of the invention, showing the ratchet and drive motor plates and the clutch bearing.

Referring to FIG. 1, there is shown a perspective view of the invention 10. The ratchet and ball magnetic index device 10 is comprised of a drive motor plate 15 located above a ratchet plate 30. A clutch bearing 23 is disposed between drive motor plate 15 and ratchet plate 30. At least one magnetically attractable detent ball 25 is located below ratchet plate 30 and at least one magnetically attractable drive ball 26 is located between drive motor plate 15 and ratchet plate 30.

Drive motor plate 15 contains a top surface 40 and a bottom surface 39. An actuator armature 22 is mounted to top surface 40 of drive motor plate 15. Armature 22 is fitted around a rotor shaft 11 and moves freely around shaft 11. A sector motor coil assembly, (not shown), is employed to turn armature 22 of drive motor plate 15. This motor may be of a conventional type such as described in U.S. Pat. No. 3,970,980. Drive motor plate 15 is made out of a nonmagnetic material, such as aluminum or plastic, and may be manufactured in a variety of shapes and sizes. There is provided at least one ball receiving recess 12, formed along the periphery of bottom surface 39 of drive motor plate 15. Recess 12 is formed as to completely enclose and capture drive ball 26. Recess 12 should be slightly larger than the diameter of drive ball 26 so as to allow the ball's free movement in a vertical direction, perpendicular to ratchet plate 30.

Clutch bearing 23 is disposed facing bottom surface 39 of drive motor plate 15, and moves freely around shaft 11. Clutch bearing 23 ensures proper alignment between drive motor plate 15 and ratchet plate 30, however, both drive motor plate 15 and ratchet plate 30 may be modified to replace clutch bearing 23.

Ratchet plate 30, secured to rotor shaft 11 with several set screws (not shown), is positioned facing clutch bearing 23 and contains a top surface 27 and a bottom surface 28. On top surface 27 is disposed a circular row of equally spaced ratchet teeth extending around the perimeter of ratchet plate 30. The rows of teeth are comprised of a flat plane 16, an incline plane 17, and a vertical plane 18. Drive ball 26 returns in a circular path beginning on flat plane 16 traveling up incline plane 17, and returning to flat plane 16.

A plurality of magnet slots 20 are drilled axially into ratchet plate 30 between top surface 27 and bottom surface 28 and lie directly beneath each of flat planes 16. A magnet 21 is inserted into each of magnet slots 20. Magnets 21 attract drive ball 26 from the top of incline plane 17 toward flat plane 16. Drive ball 26 rests on flat plane 16 and against vertical plane 18, and provides the means for transferring torque from actuator 22 and drive motor plate 15 to ratchet plate 30.

Bottom surface 28 of ratchet plate 30 contains a plurality of concave detents 19 which are milled directly beneath plurality of magnet slots 20 and flat planes 16. At least one magnetically attractable detent ball 25 is positioned beneath ratchet plate 30 and travels along the peripheral edge of ratchet plate 30 on surface 28. Detent ball 25 is similarly attracted to magnets 21. The presence of detent ball 25 allows a precise positioning of ratchet plate 30 and prevents the plate from over rotating. The depth of detents 19 may be modified and adjusted depending upon the size and load of the switch operated. In addition, the detents may be milled either symmetrical or asymmetrical to prevent rotation in an undesired direction.

Figure 2A:
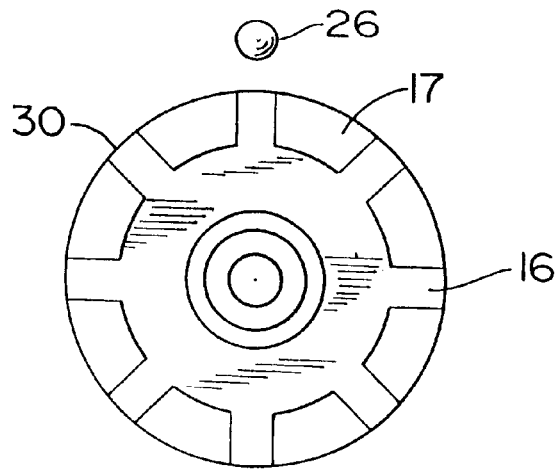
FIG. 2a is a top plan view of the ratchet plate.

Referring to FIG. 2a, there is shown a top plan view of ratchet plate 30. Drive ball 26 rotates ratchet plate 30 to a commanded position, and upon removal of an electrical command, returns in a circular path beginning on flat plane 16, traveling up incline plane 17 and returning to next flat plane 16.

Figure 2B:
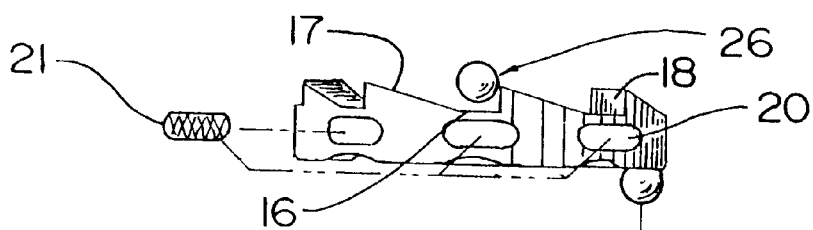
FIG. 2b is a side plan view of the ratchet plate.

Referring to FIG. 2b, there is shown a side plan view of ratchet plate 30 wherein magnets 21 are inserted into magnet slots 20 below flat planes 16. Drive ball 26 is attracted toward magnets 21, and comes to rest on flat plane 16 and against vertical plane 18. Drive ball 26 is positioned to rotate ratchet plate 30 when the next electrical command pulse is received.

Figure 2C:
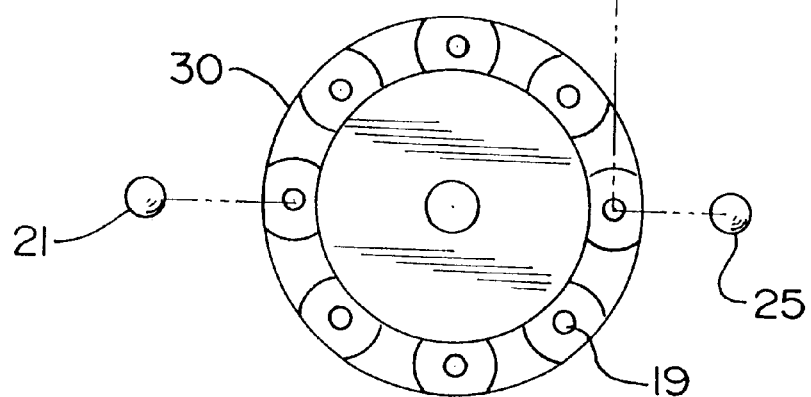
FIG. 2c is a bottom plan view of the ratchet plate.

Referring to FIG. 2c, there is shown a bottom plan view of ratchet plate 30. Detent ball 25 is attracted to magnets 21 and comes to rest in one of the plurality of detents 19. Detents 19 provide indexing due to any under or over rotation of the switch.

Figure 3:
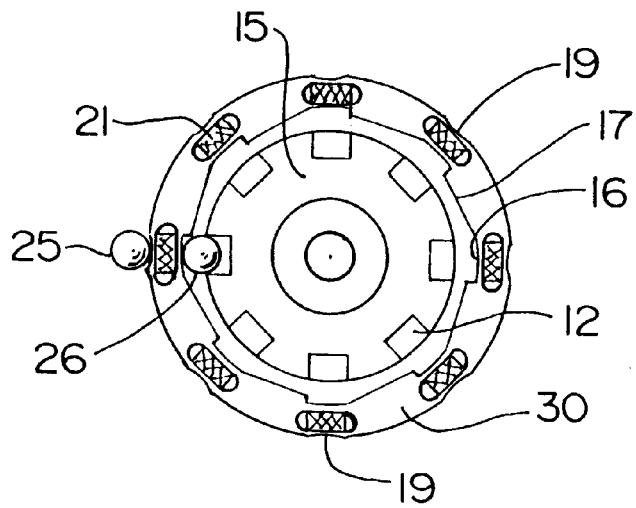
FIG. 3 is a drawing of an additional embodiment of the present invention.

Referring to FIG. 3, there is shown an alternative embodiment of ratchet and ball magnetic index device 10. Drive motor plate 15 is located within a ring formed by ratchet plate 30. Detent balls 25 and drive ball 26 operate in a horizontal motion as opposed to the vertical operation of the preferred embodiment.

Figure 4:
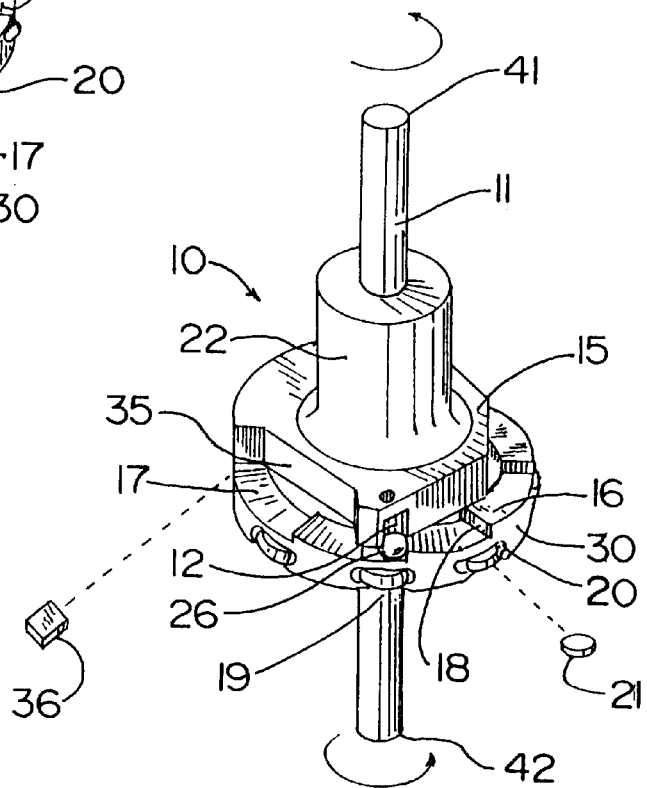
FIG. 4 is a perspective view of the ratchet and ball magnetic index device with the steel ball in the ratcheting position.

Referring to FIG. 4, ratchet and ball magnetic index device 10 is positioned so as to drive ratchet plate 30 in a counterclockwise position. Drive ball 26 is located on flat plane 16 resting against vertical plane 18. A portion of drive ball 26 is located within ball receiving recess 12 of drive motor plate 15. When the sector motor (not shown) is pulsed on, drive motor plate 15 rotates and contacts drive ball 26. Drive ball 26 in turn contacts vertical plane or edge 18, and causes ratchet plate 30 to rotate counterclockwise. As ratchet plate 30 is secured to rotor shaft 11, rotor shaft 11 also rotates counterclockwise.

Rotor shaft 11 contains a bottom end 42 and may contain a slotted end 41. Bottom end 42 is secured to a switch (not shown). Slotted end 41 may be manually used to rotate ratchet plate 30 and the attached switch in the event of a malfunction using a tool. When rotor shaft 11 rotates, the switch (not shown) rotates to the next position. A drive stop support 35 in conjunction with a drive stop pin 36, prevents the over rotation of remote switch (not shown) attached to rotor shaft 11.

Figure 5:
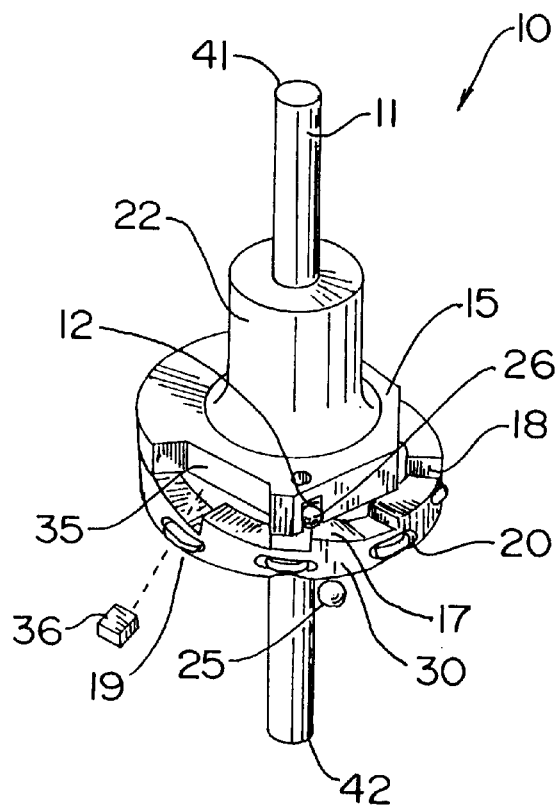
FIG. 5 is a perspective view of the ratchet and ball magnetic index device with the drivel ball in the return position.

Referring to FIG. 5, when the command pulse to the sector motor subsides, the sector motor then rotates clockwise due to the motor's inherent magnetic counter torque. The sector motor will rotate clockwise until drive stop support 35 contacts drive stop pin 36. This return process time is known as the sector motor's slip-back time. In the return process, drive ball 26 is forced in a clockwise direction by the action of drive motor plate 15 and ball receiving recess 12. Drive ball 26 is forced up incline plane 17 until the attractive magnetic forces of magnets 21 attract drive ball 26 toward flat plane 16. Simultaneously, detent ball 25 is forced to the next detent position 19. This return process transfers a minimal amount of energy to ratchet plate 30. A simple, reliable sector motor may be used to step drive motor plate 15 sequentially in a fixed number of degrees. A reliable sector motor in combination with the ratchet and ball magnetic index device results in reliable operation with a minimal amount of weight and cost. Detent ball 25 and drive stop support 35 minimize the amount of over rotation of the remote switch and aid in the reliability of operation. The duration of the sector motor's slip-back time is about 50 msec., therefore the minimum spacing between repeating input command pulses to a specified switch is about 75 msec. This recorded switch time is an advantage over the prior art.

The sector motor and ratchet device may be machined to accommodate several different step positions. Among the more common steps are 45°, 60° and 90° stepping functions.

Figure 6:
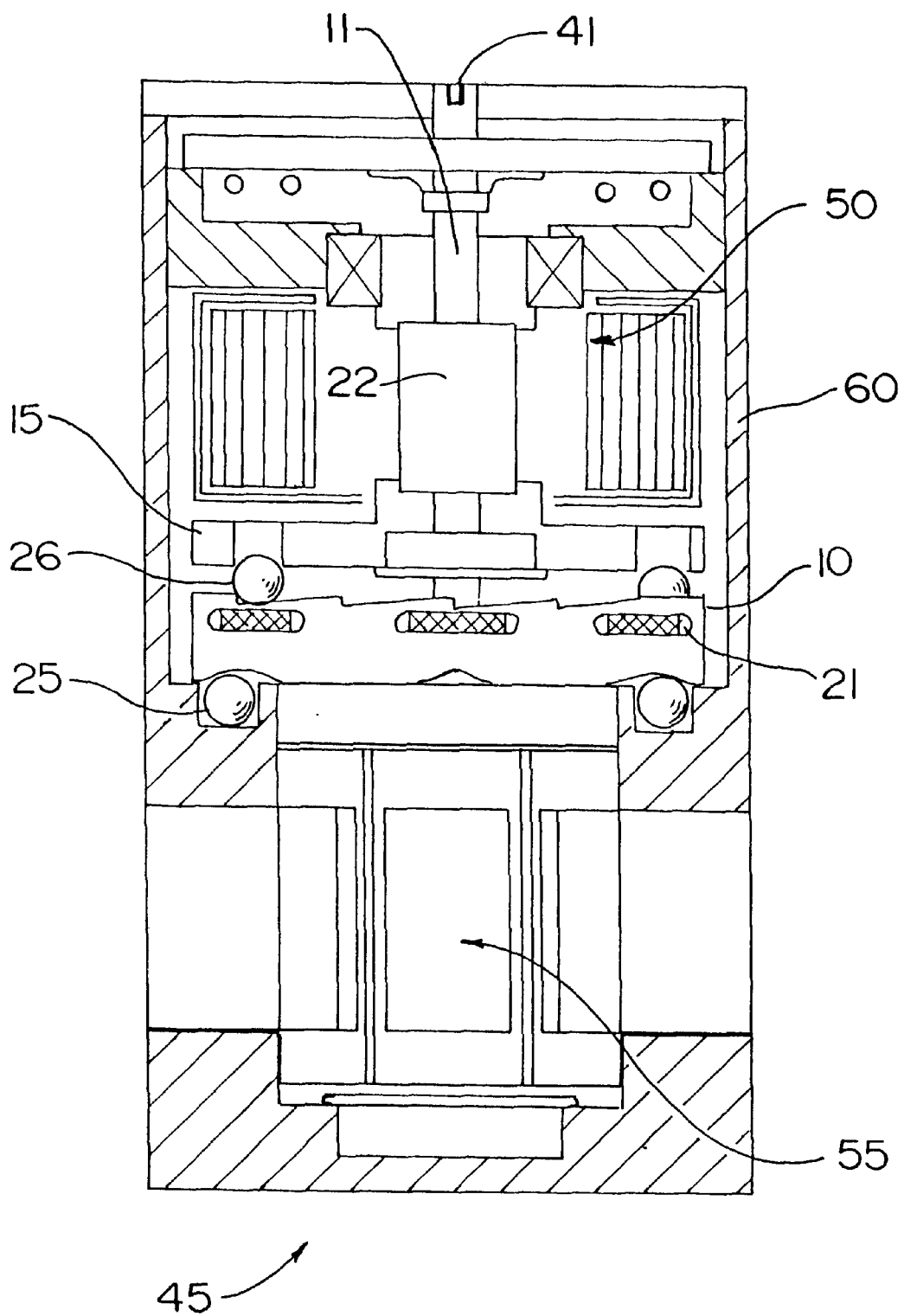
FIG. 6 is a cross-sectional view of a magnetic switch module for microwave transmission using the invention.

Referring to FIG. 6, there is shown a cross-sectional view of a switch module 45 comprising; a sector motor 50 as described in U.S. Pat. No. 3,970,980 connected to ratchet and ball magnetic index device 10; and a microwave waveguide switch 55 as described in U.S. Pat. No. 4,617,538, similarly connected to ratchet and ball magnetic index device 10. The ratchet and ball magnetic index device 10 in combination with sector motor 50 and waveguide switch 55 provide an extremely reliable remote switch. It should be noted that the ratchet and ball magnetic index device 10 may be used with most sector motors and remote switches.

Figure 7:
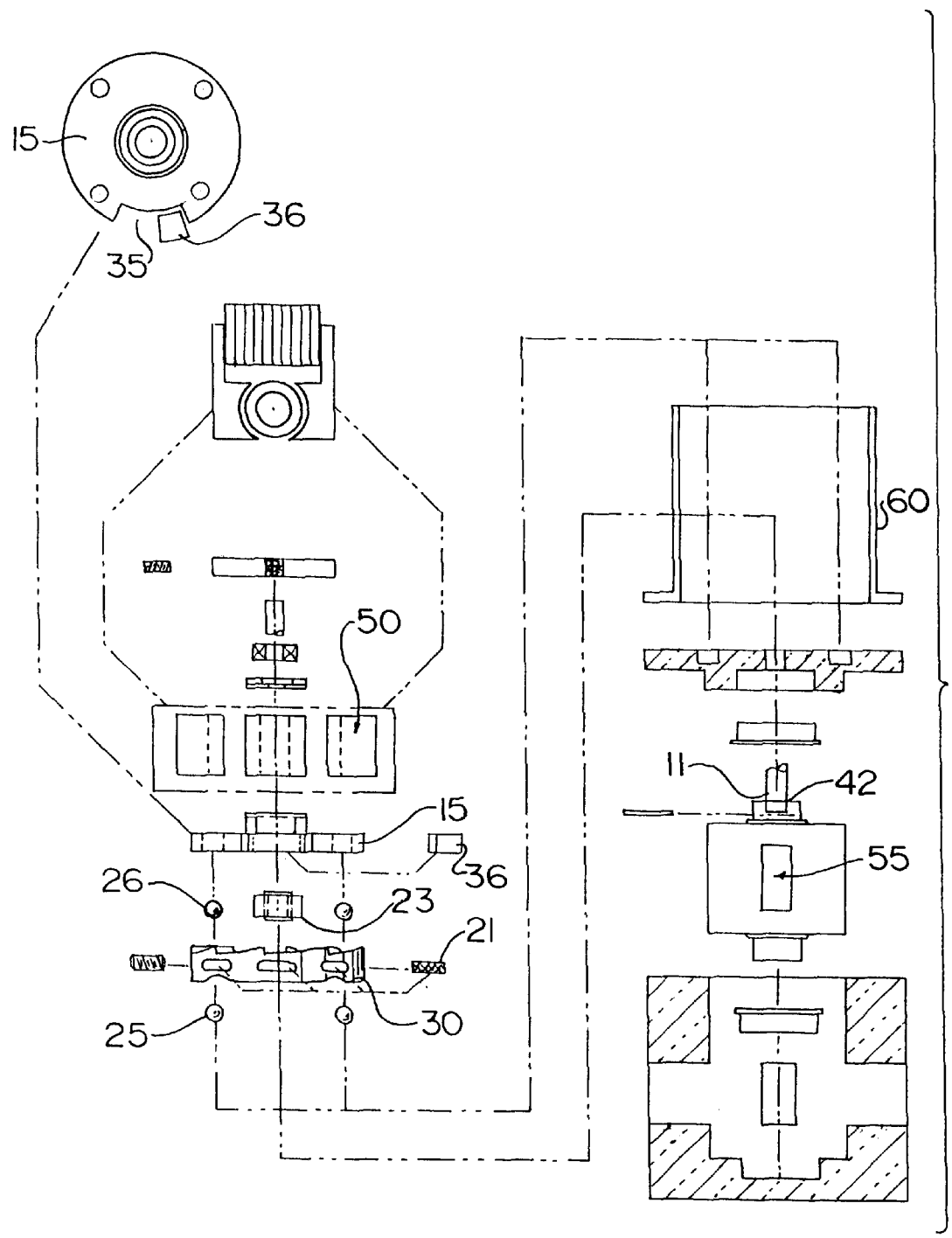
FIG. 7 is an exploded cross-sectional view of a magnetic switch module for the transmission of microwave energy, using the invention.

Referring to FIG. 7, there is shown an exploded cross-sectional view of switch module 45. Of particular interest is a top view of drive motor plate 15. Drive stop support 35 and drive stop pin 36 act, in combination, to prevent over rotation. When the sector motor turns drive motor plate 15, drive stop pin 36 impacts one end of drive stop support 35 thereby preventing any over rotation. Drive stop pin 36 is secured to a housing assembly 60. When the sector motor turns off, drive stop pin 36, fixed with respect to drive motor plate 15, rests against the other end of drive stop support 35.

Clutch bearing 23, located between drive motor plate 15 and ratchet plate 30, provides proper alignment between the two plates. In addition, bottom end 42 of rotor shaft 11 is secured to waveguide switch 55. When ratchet plate 30 rotates, rotor shaft 11 rotates in the same direction and steps waveguide switch 55 to the next position.

While only two embodiments of the present invention have been shown and described, it is to be understood that many changes and modifications may be made thereunto without departing from the spirit and scope of the invention as defined in the appended claims.

What it is claimed:

1. A ratchet and ball magnetic index device for the precise positioning of a remote switch located within a housing assembly and actuated by an electric motor comprising:
    a rotor shaft having a top end and a bottom end, wherein said bottom end is secured to the remote switch;
    a drive motor plate having a top surface and a bottom surface, wherein said drive motor plate contains at least one ball receiving recess located on the periphery of said bottom surface of said drive motor plate;
    a permanent magnet armature secured to said top surface of said drive motor plate and freely rotatable around said rotor shaft, wherein said armature is inserted into the electric motor, thereby forming an integral part of the electric motor;
    a ratchet plate, having a top surface and a bottom surface, secured to said rotor shaft and disposed facing said drive motor plate, wherein said top surface has a plurality of contours displaced around the circumference of said ratchet plate, each of said contours having a flat plane connected to an incline plane which is connected to a vertical plane;
    at least one magnetically attractable drive ball positioned between said top surface of said ratchet plate and said bottom surface of said drive motor plate, wherein said at least one magnetically attractable drive ball moves freely within said ball receiving recess; and
    a plurality of permanent magnets positioned between said top surface and said bottom surface of said ratchet plate and located beneath each of said flat planes, so that the rotation of said drive motor plate engages said drive ball via said ball receiving recess, and said drive ball engages said ratchet plate secured to said rotor shaft, causing said rotor shaft to rotate the remote switch attached to said rotor shaft.

2. The ratchet and ball magnetic index device as in claim 1, wherein said ratchet plate and said drive motor plate are constructed of a non-magnetic material.

3. The ratchet and ball magnetic index device as in claim 1, wherein said bottom surface of said ratchet plate further comprises:
    a plurality of detents located beneath each of said flat planes, wherein said plurality of detents may be modified depending upon the type of switch used; and
    at least one magnetically attractable detent ball located facing said bottom surface of said ratchet plate, wherein said at least one magnetically attractable detent ball is moveable between each of said detents.

4. The ratchet and ball magnetic index device as in claim 1 further comprising:
    a drive stop support located along the periphery of said drive motor plate and having a length sufficient to correspond to the number of degrees of each switch position; and
    a drive stop pin, secured to the housing assembly, for engagement with said drive stop support to prevent over-rotation of said drive motor plate.

5. The ratchet and ball magnetic index device as in claim 1, wherein said at least one magnetically attractable drive ball is made of ⅛" diameter steel.

6. The ratchet and ball magnetic index device as in claim 1, wherein said plurality of permanent magnets are made of neodymium.

7. The ratchet and ball magnetic index device as in claim 1, wherein said plurality of contours numbers 8 corresponding to 45° detent positions.

8. The ratchet and ball magnetic index device as in claim 1, wherein said plurality of contours numbers 4 corresponding to 90° detent positions.

9. The ratchet and ball magnetic index device as in claim 1, wherein said plurality of contours numbers 12 corresponding to 30° detent positions.

10. The ratchet and ball magnetic index device as in claim 3, wherein said at least one magnetically attractable detent ball is made of ⅛" diameter steel.

11. The ratchet and ball magnetic index device as in claim 1, wherein said top end of said rotor shaft is slotted to allow the rotation of said rotor shaft using a tool.

12. A ratchet and ball magnetic index device for the precise positioning of a remote switch located within a housing assembly comprising:
    a rotor shaft having a slotted top end and a bottom end, wherein said bottom end is secured to the remote switch;
    a drive motor plate having a top side and a bottom side, wherein said drive motor plate contains at least one ball receiving recess located between said top surface and said bottom surface and extending radially outward from the center of said drive motor plate;
    a magnetic armature secured to said top surface of said drive motor plate and freely rotatable around said rotor shaft;
    a ratchet ring, secured to said rotor shaft, having an interior circumference and an exterior circumference, wherein said interior circumference has a plurality of contours displaced in a circular direction around said interior circumference of said ratchet ring, each of said contours having a first plane parallel to said interior circumference connected to an incline plane which is connected to a vertical plane which is perpendicular to said interior circumference;
    at least one magnetically attractable drive ball positioned between said drive motor plate and said interior circumference of said ratchet ring, wherein said at least one magnetically attractable drive ball moves freely within said at least one ball receiving recess; and
    a plurality of permanent magnets positioned between said interior circumference and said exterior circumference of said ratchet ring and located beneath each of said flat planes as seen extending radially outward.

13. The ratchet and ball magnetic index device as in claim 12, wherein said ratchet ring and said drive motor plate are constructed of a non-magnetic material.

14. The ratchet and ball magnetic index device as in claim 12, wherein said exterior circumference of said ratchet ring further comprises:

a plurality of detents located beneath each of said flat planes as viewed radially outward, wherein said plurality of detents may be modified depending upon the type of switch used; and at least one magnetically attractable detent ball located beneath, as viewed radially outward, said exterior circumference of said ratchet ring, wherein said at least one magnetically attractable detent ball is moveable between each of said detents.

15. The ratchet and ball magnetic index device as in claim 12, wherein said at least one magnetically attractable drive ball is made of ⅛" diameter steel.

16. The ratchet and ball magnetic index device as in claim 12, wherein said plurality of permanent magnets are made of neodymium.

17. The ratchet and ball magnetic index device as in claim 12, wherein said plurality of contours numbers 8 corresponding to 45° detent positions.

18. The ratchet and ball magnetic index device as in claim 12, wherein said plurality of contours numbers 4 corresponding to 90° detent positions.

19. The ratchet and ball magnetic index device as in claim 12, wherein said plurality of contours numbers 12 corresponding to 30° detent positions.

20. The ratchet and ball magnetic index device as in claim 14, wherein said at least one magnetically attractable detent ball is made of ⅛" diameter steel.

21. The ratchet and ball magnetic index device as in claim 12 further comprising:

a drive stop support disposed on said drive motor plate and having a length sufficient to correspond to the number of degrees of each switch position; and a drive stop pin, secured to the housing assembly, for engagement with said drive stop support to prevent over-rotation of said drive motor plate.

22. The ratchet and ball magnetic index device as in claim 3, wherein said plurality of detents are each formed symmetrical in shape to correctly position said ratchet plate.

23. The ratchet and ball magnetic index device as in claim 3, wherein said plurality of detents are each formed asymmetrical in shape to correctly position said ratchet plate.

24. A ratchet and ball magnetic index device located within a housing assembly comprising:

a rotor shaft having a top end and a bottom end;

a drive motor plate having a top surface and a bottom surface, wherein said drive motor plate contains at least one ball receiving recess located on the periphery of said bottom surface of said drive motor plate;

a permanent magnet armature secured to said top surface of said drive motor plate and freely rotatable around said rotor shaft;

a sector motor disposed facing said top surface of said drive motor plate, wherein said armature is inserted into said sector motor and forms an integral part of said sector motor, said sector motor rotates said magnetic armature secured to said drive motor plate;

a ratchet plate, having a top surface and a bottom surface, secured to said rotor shaft and disposed facing said drive motor plate, wherein said top surface has a plurality of contours displaced around the circumference of said ratchet plate, each of said contours having a flat plane connected to an incline plane which is connected to a vertical plane;

at least one magnetically attractable drive ball positioned between said top surface of said ratchet plate and said bottom surface of said drive motor plate, wherein said at least one magnetically attractable drive ball moves freely within said ball receiving recess;

a plurality of permanent magnets positioned between said top surface and said bottom surface of said ratchet plate and located beneath each of said flat planes; and a microwave waveguide switch, fixedly connected to said bottom end of said rotor shaft facing said bottom surface of said ratchet plate, wherein said microwave waveguide switch rotates in conjunction with said ratchet plate, so that the rotation of said drive motor plate engages said drive ball via said ball receiving recess, and said drive ball engages said ratchet plate secured to said rotor shaft, causing said rotor shaft to rotate said microwave waveguide switch attached to said rotor shaft.

25. A ratchet and ball magnetic index device located within a housing assembly comprising:

a rotor shaft having a top end and a bottom end;

a drive motor plate having a top surface and a bottom surface, wherein said drive motor plate contains at least one ball receiving recess located on the periphery of said bottom surface of said drive motor plate;

a permanent magnet armature secured to said top surface of said drive motor plate and freely rotatable around said rotor shaft;

a sector motor disposed facing said top surface of said drive motor plate, wherein said armature is inserted into said sector motor and forms an integral part of said sector motor, said sector motor rotates said magnetic armature secured to said drive motor plate;

a ratchet plate, having a top surface and a bottom surface, secured to said rotor shaft and disposed facing said drive motor plate, wherein said top surface has a plurality of contours displaced around the circumference of said ratchet plate, each of said contours having a flat plane connected to an incline plane which is connected to a vertical plane;

at least one magnetically attractable drive ball positioned between said top surface of said ratchet plate and said bottom surface of said drive motor plate, wherein said at least one magnetically attractable drive ball moves freely within said ball receiving recess;

a plurality of permanent magnets positioned between said top surface and said bottom surface of said ratchet plate and located beneath each of said flat planes; and a coaxial switch, fixedly connected to said bottom end of said rotor shaft facing said bottom surface of said ratchet plate, wherein said coaxial switch rotates in conjunction with said ratchet plate, so that the rotation of said drive motor plate engages said drive ball via said ball receiving recess, and said drive ball engages said ratchet plate secured to said rotor shaft, causing said rotor shaft to rotate said coaxial switch attached to said rotor shaft.

* * * * *